US009300039B2

(12) United States Patent
Conti et al.

(10) Patent No.: US 9,300,039 B2
(45) Date of Patent: Mar. 29, 2016

(54) TRIAXIAL POSITIONER FOR AN ANTENNA

(75) Inventors: Dominique Conti, Colombes (FR); Gwenaël Tor, Colombes (FR); Philippe Desgardin, Colombes (FR); Alain Bonnet, Clermont-Ferrand (FR)

(73) Assignees: THALES, Courbevoie (FR); ACC INGENIERIE ET MAINTENANCE, Clermont-Ferrand (FR)

( * ) Notice: Subject to any disclaimer, the term of this patent is extended or adjusted under 35 U.S.C. 154(b) by 1158 days.

(21) Appl. No.: 13/279,004

(22) Filed: Oct. 21, 2011

(65) Prior Publication Data

US 2012/0274520 A1 Nov. 1, 2012

(30) Foreign Application Priority Data

Oct. 25, 2010 (FR) ..................................... 10 04178

(51) Int. Cl.

*F16M 13/00* (2006.01)
*H01Q 3/08* (2006.01)
*H01Q 1/18* (2006.01)
*H01Q 1/34* (2006.01)

(52) U.S. Cl.

CPC . *H01Q 3/08* (2013.01); *H01Q 1/18* (2013.01); *H01Q 1/34* (2013.01)

(58) Field of Classification Search

CPC .............. H01Q 1/34; H01Q 3/08; H01Q 1/18
USPC ............ 248/179.1, 278.1, 583, 661; 343/765, 343/840, 882
See application file for complete search history.

(56) References Cited

U.S. PATENT DOCUMENTS

| | | | | |
|---|---|---|---|---|
| 4,282,529 A * | 8/1981 | Speicher | ........................ | 343/765 |
| 5,075,682 A * | 12/1991 | Dehnert | ........................ | 342/352 |
| 5,419,521 A | 5/1995 | Matthews | | |
| 6,198,452 B1 | 3/2001 | Beheler et al. | | |
| 6,538,612 B1 * | 3/2003 | King | ........................ | 343/757 |
| 6,611,236 B1 * | 8/2003 | Nilsson | ........................ | 343/757 |
| 2002/0030631 A1 | 3/2002 | Verkerk | | |
| 2004/0150574 A1 * | 8/2004 | Harron | ........................ | 343/765 |

FOREIGN PATENT DOCUMENTS

| | | | |
|---|---|---|---|
| JP | 2008-219233 | A | 9/2008 |
| WO | 9305363 | A1 | 3/1993 |
| WO | 2006/050392 | A1 | 5/2006 |
| WO | 2010/076336 | A1 | 7/2010 |

* cited by examiner

*Primary Examiner* — Gwendolyn Baxter
(74) *Attorney, Agent, or Firm* — Baker & Hostetler LLP

(57) ABSTRACT

A positioner for an antenna intended to be placed in a given or restricted volume comprises: a first axis Aα ensuring the movement of the antenna in azimuth, a third axis Aγ ensuring the movement of the antenna in elevation, said third axis Aγ being orthogonal and coplanar to the first axis Aα, and a second axis of rotation Aβ or cross-elevation axis positioned so as to intersect said first axis Aα and said third axis Aγ at one and the same virtual point O, said virtual point O of intersection of the three axes Aα, Aβ, Aγ constituting the pivot point of the movements of said antenna mounted on the positioner.

9 Claims, 8 Drawing Sheets

TRIAXIAL POSITIONER FOR AN ANTENNA

CROSS-REFERENCE TO RELATED APPLICATION

This application claims priority to foreign French patent application No. FR 1004178, filed on Oct. 25, 2010, the disclosure of which is incorporated by reference in its entirety.

FIELD OF THE INVENTION

The object of the present invention relates to a compact triaxial positioner for an antenna intended to be positioned, for example, on a naval carrier, aircraft or submarine, the antenna being arranged in a volume of given dimension or in a confined volume.

The invention applies notably to the field of satellite communications from a moving carrier, for example, boats, submarines, drones, etc., by virtue of the positioner system according to the invention that has a servocontrol on the direction of pointing of the antenna to the targeted satellite.

In the description, the expression "elevation angle" is the angle between the horizontal plane and the straight line going from a craft to a targeted object above the horizon. This angle is counted to be positive when the identified object is above the indicated horizontal plane, negative otherwise. The azimuth angle is the horizontal angle between the direction of an object and a reference direction. The expression "cross-elevation" designates the rotation of the antenna around a third axis situated in a plane perpendicular to the elevation axis. This cross-elevation axis is used to eliminate the singular point that exists when the antenna points to the zenith.

There are also defined:

- a first axis Aα ensuring the movement of the antenna in azimuth,
- a second axis of rotation Aβ or cross-elevation axis,
- a third axis Aγ ensuring the movement of the antenna in elevation.

BACKGROUND

In the field of communications using an antenna positioned on a carrier and in a confined volume, the technical problems to be resolved are notably the following:

- to ensure a continuous and accurate pointing of the antenna towards the satellite,
- to allow for a hemispherical pointing without a singular point,
- to retain the aim of the antenna towards the satellite by taking into account movements of the carrier, such as the roll, the pitch, the yaw, the gyration effect of the carrier,
- to have a maximum antenna travel area in order to be able to retain the aim of the satellite on movements of the carrier with pitch and roll of large amplitude even when the satellite is situated at a lower elevation relative to the carrier,
- to be adapted to the levels of vibrations and of mechanical impacts encountered on the mobile carriers,
- to be very compact with a minimal external diameter, a reduced height and a low weight,
- to have a significant free volume on the rear part of the antenna in order to be able to embed transmission and/or reception radiofrequency RF equipment,
- to be simple to produce, to install and to maintain in operation.

To resolve some of these problems, the prior art describes different positioning systems with 2 or 3 axes.

The patent application US 2002/0030631 describes a positioner with 2 axes, X-Y mount, using a half-ring for the X axis rotation.

The patent U.S. Pat. No. 6198452 discloses a positioner with 3 axes in which the elements ensuring the motor-drive of the 3 axes are superposed relative to one another having a significant bulk heightwise, axes that converge at one and the same point offering an optimized volume of revolution of the antenna, non-orthogonal and coplanar axes exhibiting complex kinematics. Its drawbacks are its significant bulk heightwise and complex kinematics.

The patent application WO 93/05363 describes a positioner with 3 perpendicular axes. The azimuth and elevation axes are perpendicular. The third cross-elevation axis converging with the first two is horizontal and perpendicular to the other two axes. The motor-drive elements of the elevation and cross-elevation axes use mechanical motor/belt/pulley assemblies arranged in the rear part of the antenna. An inclined central foot and a mechanical axis at the rear of the antenna supports the motor-drive elements. In this case, the drawback with this positioner results from the complexity and the bulk of the mechanical motor/belt/pulley motor-drive elements and of the fastening elements situated at the rear of the antenna. Because of this, the space available at the rear of the antenna is not optimized.

The positioners known to the Applicant do not notably resolve the following problems:

a) to have a 3-axis antenna positioner with minimal bulk that has:
b) a kinematic of the movements of the antenna that lies within a cylinder of diameter equal to the diameter of the antenna mounted on the antenna positioner,
c) a reduced positioner system height,
d) an extended antenna pointing area, greater than the half-sphere, to allow for negative pointing,
e) to be able to have maximum free space at the rear of the antenna for placing electronic or RF transmission and/or reception components for example,
f) to obtain a mechanical design and a motor-drive that are simple and compact.

SUMMARY OF THE INVENTION

The positioner that is the subject of the present invention aims to overcome at least one of the drawbacks mentioned above and not resolved by the systems of the prior art.

The object relates to a positioner P for an antenna intended to be placed in a given or restricted volume, comprising, in combination, at least the following elements.

A first axis Aα ensuring the movement of the antenna in azimuth, said first axis Aα with continuous rotation comprises: a fixed frame on which are mounted a mobile frame, an electrical collector provided with a revolving seal and an a motor-drive subassembly, A third axis Aγ ensuring the movement of the antenna in elevation, said third axis Aγ being orthogonal and coplanar to the first axis Aα, said third axis Aγ comprises a cradle supporting the antenna and two half-rings for circular guidance, said half-rings being provided with V-shaped guiding rails sliding on the grooves of said rollers, said third axis Aγ being inserted into the roller support of said second axis Aβ.

A second axis of rotation Aβ or cross-elevation axis positioned so as to intersect said first axis Aα and said third axis Aγ at one and the same virtual point O, said virtual point O of intersection of the three axes Aα, Aβ, Aγ constituting the pivot point of the movements of said antenna mounted on the positioner, said second axis Aβ comprises a support for pivoting means, such as rollers, a motor-drive subassembly β, a motor-drive subassembly γ, said rollers including a groove, Said second axis Aβ being inserted into an orifice O2 of the fixed frame forming an angle Ψ with the axis Aα, the angle Ψ lying within the range [20°, 70°].

According to a variant embodiment, said first axis Aα is adapted to define a travel of n×360 degrees in α by virtue of said revolving collector, said second axis Aβ is chosen to define a travel of +/−30°, and said third axis Aγ a travel lying within the range −18°/+110°.

According to another variant embodiment, said first axis Aα is provided with impact dampers distributed on said fixed frame.

The first axis Aα comprises, for example:

in the top part: a rolling bearing captive between an interface plate and the fixed frame, on the fixed outer ring of the rolling bearing, a ring gear is mounted to drive the axis Aα in rotation, a detection cam which will make it possible to position the axis Aα at the moment when said cam passes over a position detector attached to said mobile frame.

The positioner is, for example, made of a material that is resistant to corrosion such as an alloy of aluminium protected by bichromated anodic oxidation.

Each of said first, second and third axes comprises, for example, a toothed positioning frame associated with a gear motor with integrated coder.

The antenna is, for example, surrounded by a radome R and said positioner, antenna, radome assembly is arranged on a mobile carrier such as a ship or a submarine.

The positioner according to the invention is, for example, used for the positioning of a satcom antenna used for communications with satellites.

BRIEF DESCRIPTION OF THE DRAWINGS

Other features and advantages of the device according to the invention will become more apparent from reading the following description of an exemplary embodiment given as an illustrative and nonlimiting example, appended with the figures which represent.

DETAILED DESCRIPTION

Figure 1A:
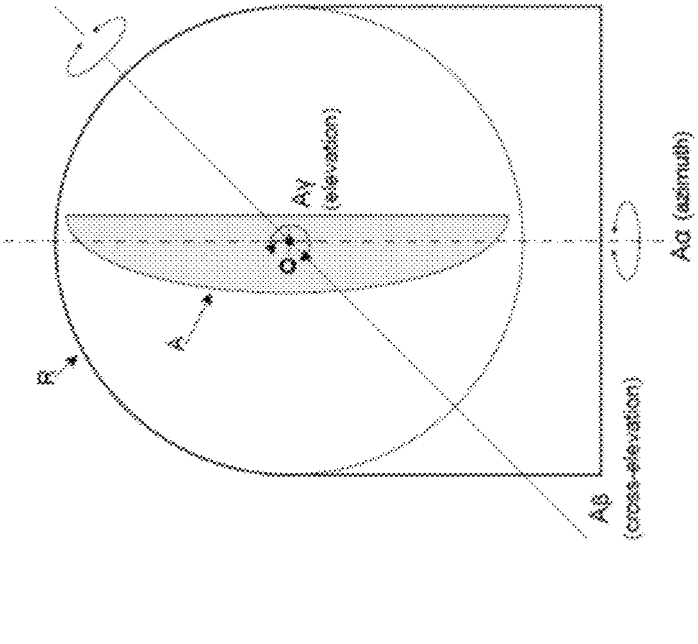
FIG. 1A, an illustration of a zero elevation by using a positioner according to the invention, FIG. 1B, a positive elevation, FIG. 1C, a negative elevation in the case of a low aim of the antenna, FIG. 1D, a positive elevation in the case of a high aim, FIGS. 2A, 2B, 2C, 2D, different views of an example of a positioner according to the invention, FIG. 3, the detail of the fixed frame of the positioner according to the invention, FIG. 4, the detail of the mobile frame, FIG. 5, a detail of the pivoting roller support, FIG. 6, the detail of the antenna support.
Figure 1B:
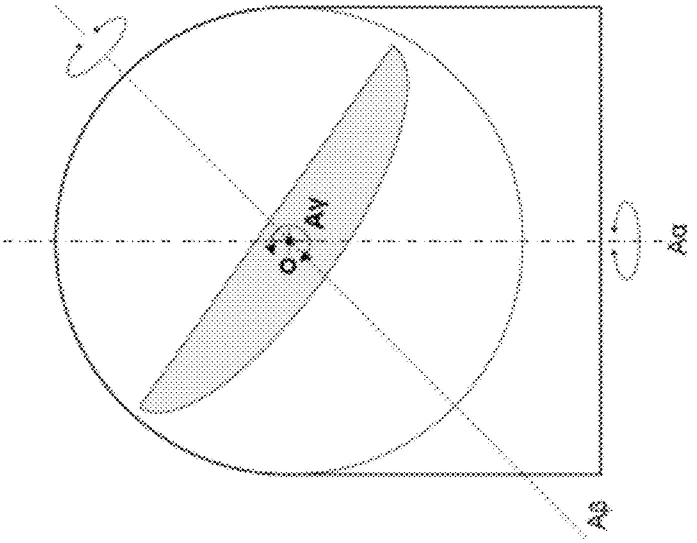
Figure 1D:
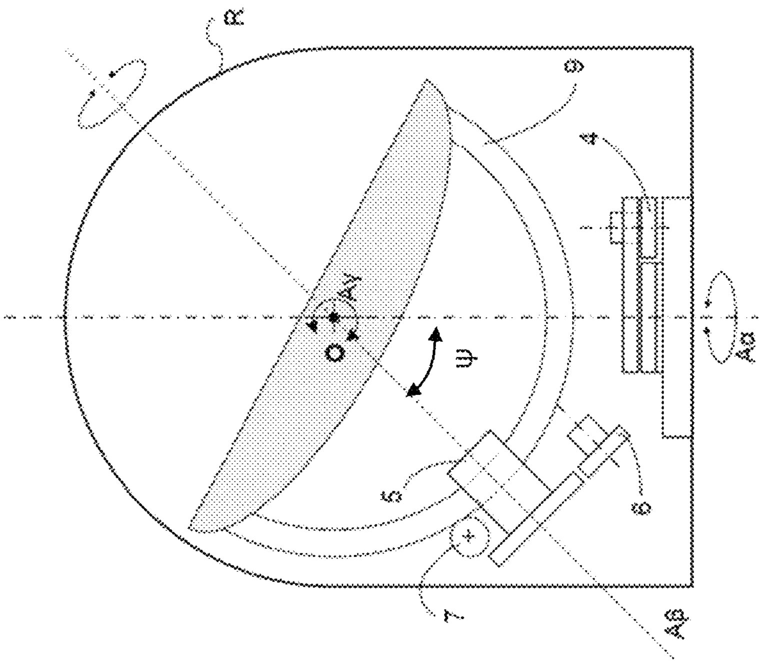
Figure 1C:
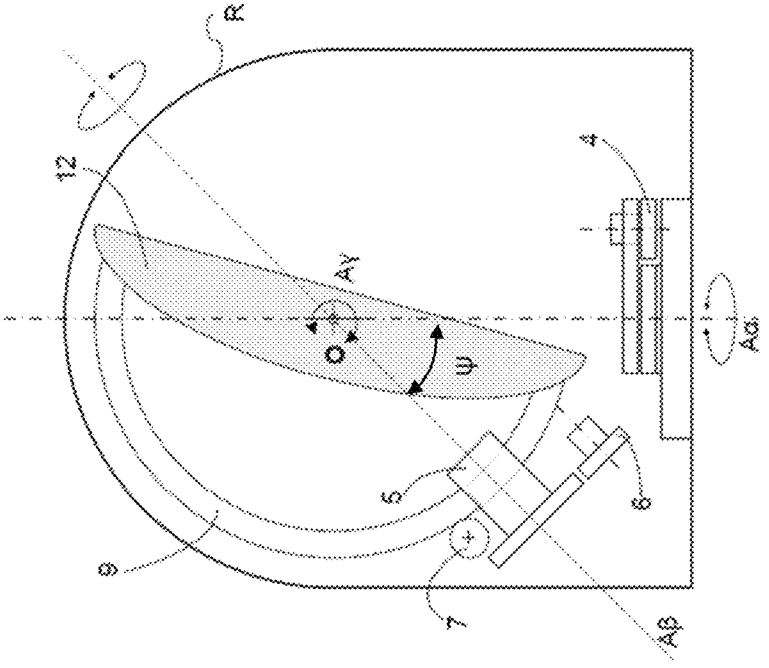

In order to better understand the structure of the antenna positioner according to the invention, the following description given as an illustrative and nonlimiting example relates to an antenna positioned in a radome whose function is notably to protect it, said radome delimiting a space in which the antenna and electronic or electrical equipment have to be positioned.

FIGS. 1A, 1B, 1C and 1D illustrate different elevation configurations in which the antenna A may be surrounded by a radome R.

The positioner according to the invention is based notably on the use of the elements listed below. The antenna positioner has 3 axes of rotation. The two axes Aα and Aγ respectively ensure the movements of the antenna in azimuth and in elevation constituting an Az/El type mount. The axis Aγ is orthogonal and coplanar to the axis Aα. The second axis of rotation A or cross-elevation axis is positioned so as to intersect the two axes Aα and Aγ at one and the same point O, a virtual point. The point of intersection of the three axes Aα, Aβ and Aγ constitutes the pivot point of the movements of the antenna 12 which is mounted on the positioner P.

The kinematics of the antenna therefore lie within a sphere centred at a point O and with a radius equal to the radius of the antenna.

The rotation relative to the axis Aγ is ensured by a half-ring guided, for example, on a stirrup with rollers 5. The half-ring 9 has a rack, not represented, for example, coupled to a gear motor 7 which drives this half-ring 9 in rotation. The antenna 12 fixed to the half-ring according to means known to those skilled in the art, thus pivots in elevation. The stirrup 5 supporting the antenna is arranged to allow for a pointing in a low direction under the horizontal axis.

Furthermore, the stirrup 5 supporting the half-ring 9 is positioned on the axis Aβ in order to be able to revolve around this axis Aβ. A rack incorporated, for example, in the stirrup and a gear motor ensures the rotation of the stirrup, half-ring and antenna assembly around the axis Aβ. The rotation of the half-ring 9 and antenna A assembly in azimuth (axis Aα) is ensured by a gear motor 4 mounted on the revolving deck 2 or mobile frame by being displaced in rotation on a ring gear, for example. Said second axis Aβ is inserted into an orifice O2 of the fixed frame forming an angle Ψ with the axis Aα, the angle Ψ lying, for example, within the range [20°, 70°].

Thus, to sum up, the operation of the positioner according to the invention is as follows:

The antenna positioner is a 3-axis positioner of azimuth (axis Aα) /cross-elevation (axis Aβ)/elevation (axis Aγ) type.

The point O of intersection of the three axes of rotation constitutes a virtual pivot point. The antenna fixed to the half-ring and passing through this pivot point describes, in its movements, a sphere centred on O. The kinematic of the antenna can therefore lie within a cylinder of diameter equal to the diameter of the antenna mounted on the antenna positioner.

The stirrup 5 supporting the half-ring 9A, 9B is used on the one hand for the driving on the axis Aγ and on the other hand for the rotation around the axis Aβ which thus makes it possible to reduce the bulk of the mechanics supporting the motor drive of the cross-elevation Aβ and elevation Aγ axes and to achieve an antenna positioner system of minimal height.

The use of the half-ring 9A, 9B for the driving on the elevation axis Aγ makes it possible to free up a maximum volume in the rear part of the antenna.

For each axis, the use, for example, of gear motors incorporating motor, coder and reducing gear associated with a rack allows for a simple, maintenance-free design. Furthermore, on the axes Aβ and Aγ, the origin datum of the coders is set by detection or landing on mechanical abutments by detection of the current maxima detailed in FIG. 5.

The basic principle having been described, FIGS. 2A, 2B, 2C and 2D will be used to give an exemplary embodiment of a positioner according to the invention.

As stated previously, the positioner has 3 axes (Aα, Aβ and Aγ) by means of the travels and the speeds of which it is possible to ensure, for example in the case of the example given, the following constraints:

the geometry of the positioner guarantees the travel of n×360 degrees in a by virtue of a revolving electrical collector, the upper axes are limited in travel as follows: axis Aβ: +/−30°, axis Aγ: −18°/+110°, the axis speeds are at least 30°/s, the axis accelerations are at least $30°/s^2$.

The antenna positioner P, for example, is made of an alloy of aluminium protected by bichromated anodic oxidation. However, any material having resistances to corrosion and sufficient strength can be used.

Each axis comprises, for example, a toothed positioning frame (pinion/ring) associated with a gear motor with integrated coder.

The fixed frame of the stabilizer is placed in this exemplary implementation on 5 impact dampers (FIG. 3) 30, distributed over a diameter of the fixed frame 1 for example of 300 mm. It is understood that, without departing from the framework of the invention, it is possible to use a number of impact dampers greater or less than 5 depending on the final conditions of use of the antenna.

FIGS. 2A, 2B, 2C and 2D describe, from different angles, an exemplary antenna positioner P according to the invention, the figures are used notably to describe the composition of the different rotation axes.

The 3-axis antenna positioner comprises, for example:

A lower axis Aα with continuous rotation comprising (FIGS. 3 and 4):

A fixed frame 1, on which are mounted a mobile frame 2, an electrical collector 3 and an α motor-drive subassembly, 4.

Figure 3:
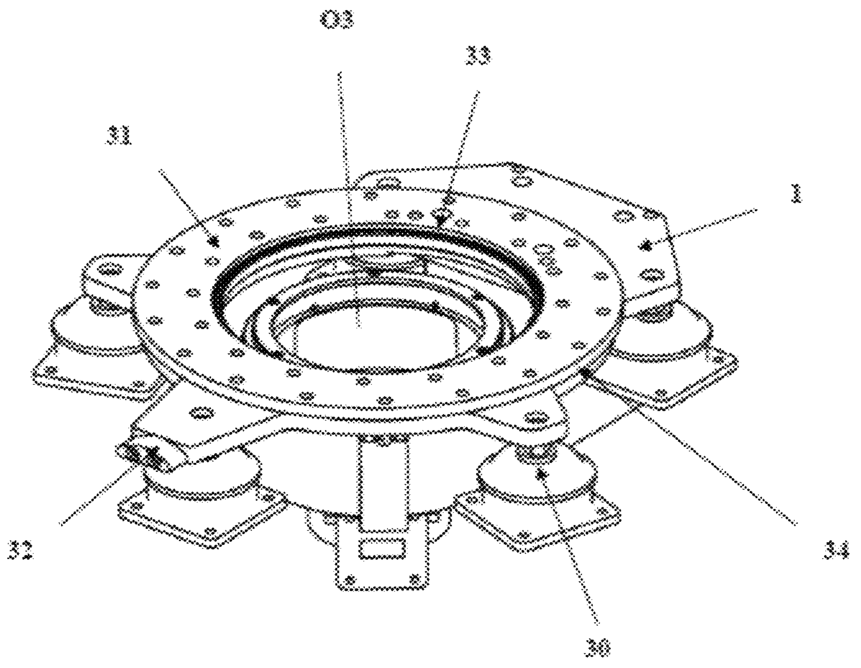

The structure of the axis Aα assembly consists, for example, of an interface plate made of treated aluminium which receives, FIG. 3:

in the upper part: a rolling bearing 33 captive between the interface plate 34 and the fixed frame 1. On the fixed outer ring of the rolling bearing, a ring gear 31 is mounted to drive the axis Aα in rotation, a detection cam 32 which will make it possible to position the axis Aα at the moment when the cam passes over the position detector 42 (FIG. 4); this can be used, for example, to establish the zero for the axis Aα, in the bottom part: 5 impact dampers 30 uniformly distributed over a diameter of 300 mm. For the dimensions to be observed, these dampers 30 are incorporated in the thickness of the radome support plate which is not represented in the interests of simplicity, in the central part: the fixing for the electrical collector provided with a revolving seal 3, on the mobile frame 2, in the lateral part, an inertial unit 13 is fixed under the interface plate 34.

The compact gear motor 4 is located on the rotating frame 2 and drives the axis Aα via a pinion 4A (FIG. 4) according to a technique known to those skilled in the art. The gear motor 4 is equipped with an incremental coder which is not represented for reasons of clarity. The gear motor and all the rolling bearings are totally sealed and greased for life.

Figure 4:
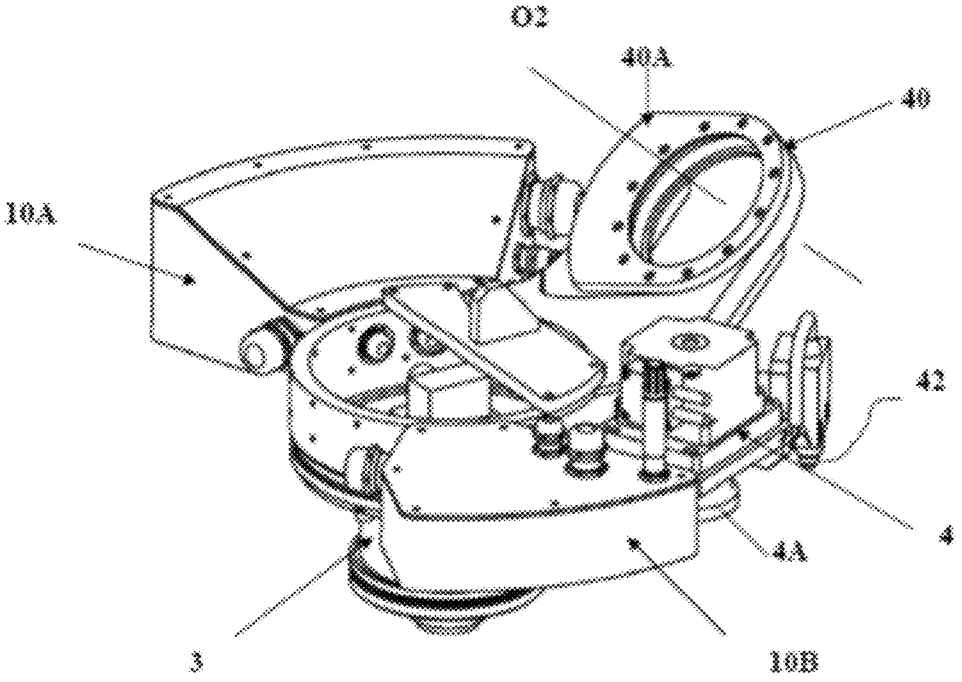

FIG. 4 schematically represents a mobile frame 2 comprising the gear motor 4 for the axis Aα, the revolving electrical collector 3, two parts 10A and 10B forming the APU, the abovementioned pinion 41 of the gear motor 4 and a piece 40 corresponding to the support for the axis Aβ. The electrical collector 3 provided with the revolving seal will be inserted into the orifice O3 of FIG. 3. The piece 40 has a substantially circular shape on a part 40A incorporating teeth for driving the axis Aβ at the level of the β motor-drive subassembly, 6, for example at the level of the pinion 6A (FIG. 2C) of the subassembly 6.

An intermediate axis Aβ (FIG. 5) comprising, for example, a pivoting roller support 5, a β motor-drive subassembly, 6, a γ motor-drive subassembly, 7.

The axis Aβ is made of machined aluminium, for example. It is supported by the axis Aα and it supports the axis Aγ:

the pivoting of the support of the axis Aβ 40, is obtained by the meshing of a toothed segment and of the fixed pinion in the top part of the axis Aα, the axis Aβ is equipped with mechanical abutments 50. The origin-setting is obtained by docking on one of the two mechanical abutments and detection of current peaks produced by methods known to those skilled in the art.

Figure 5:
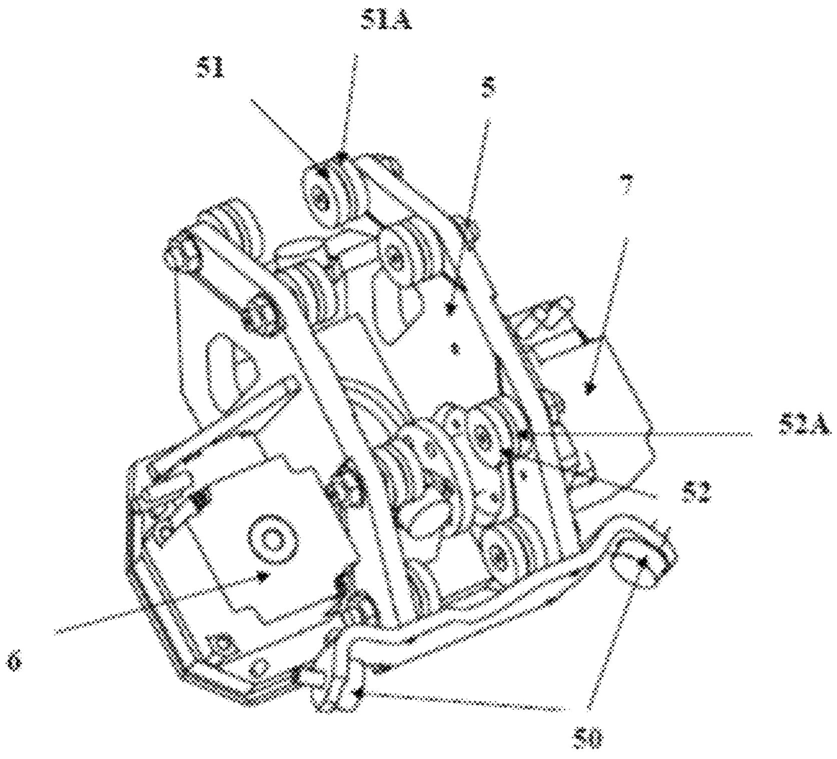
Figure 6:
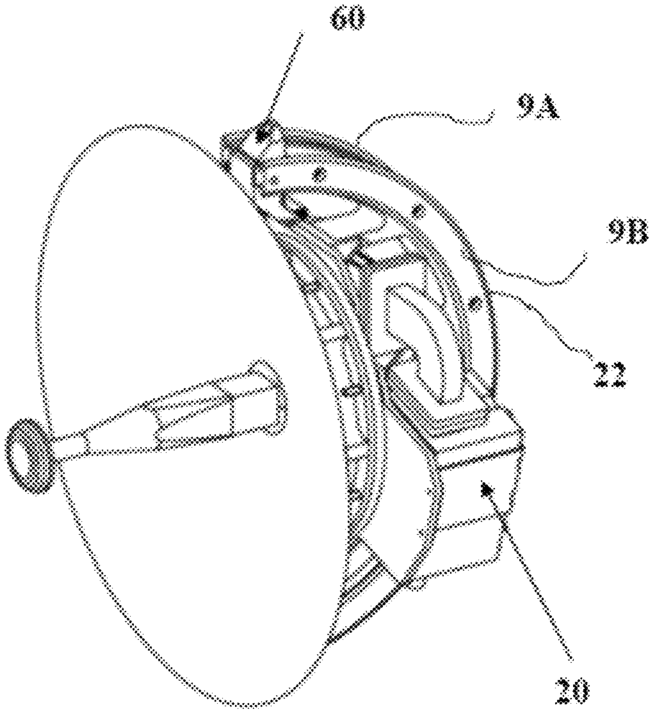

An upper axis Aγ perpendicular to the figure and consisting (FIGS. 5 and 6)

for example, of an antenna support cradle 8 and two circular guidance half-rings 9A, 9B.

Figure 2B:
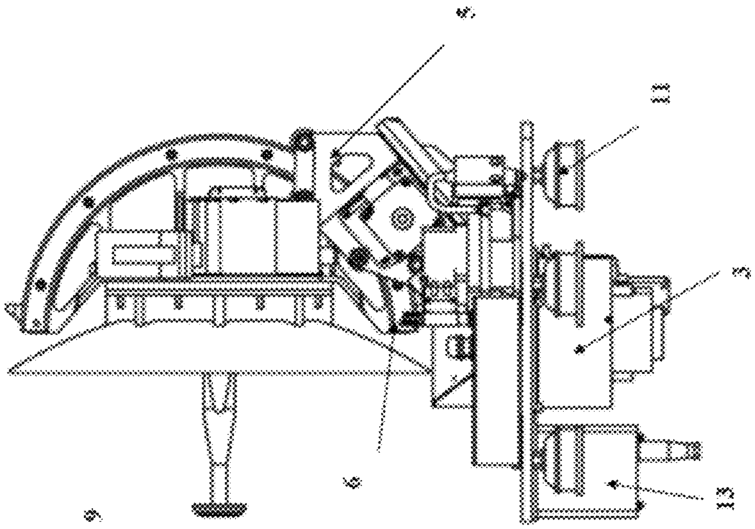
Figure 2A:
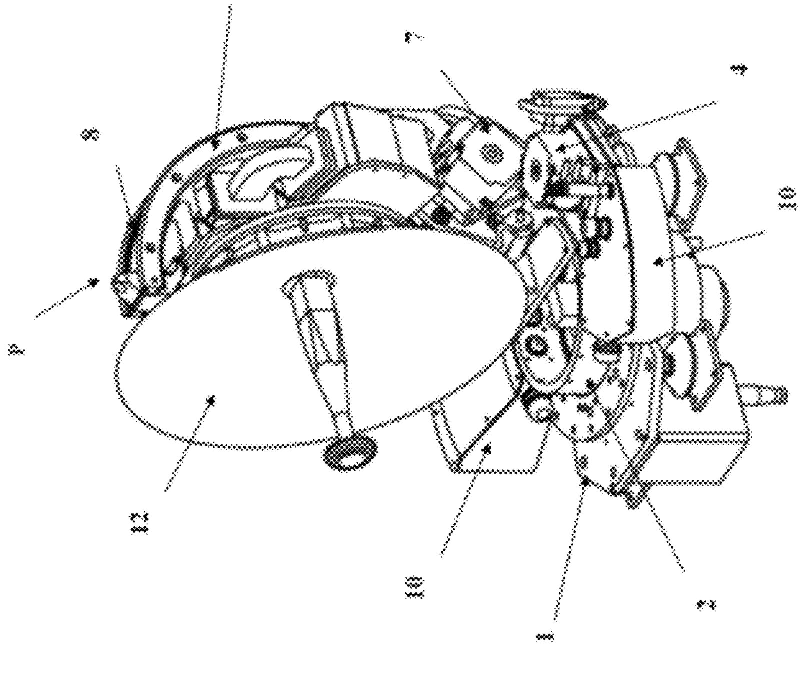
Figure 2D:
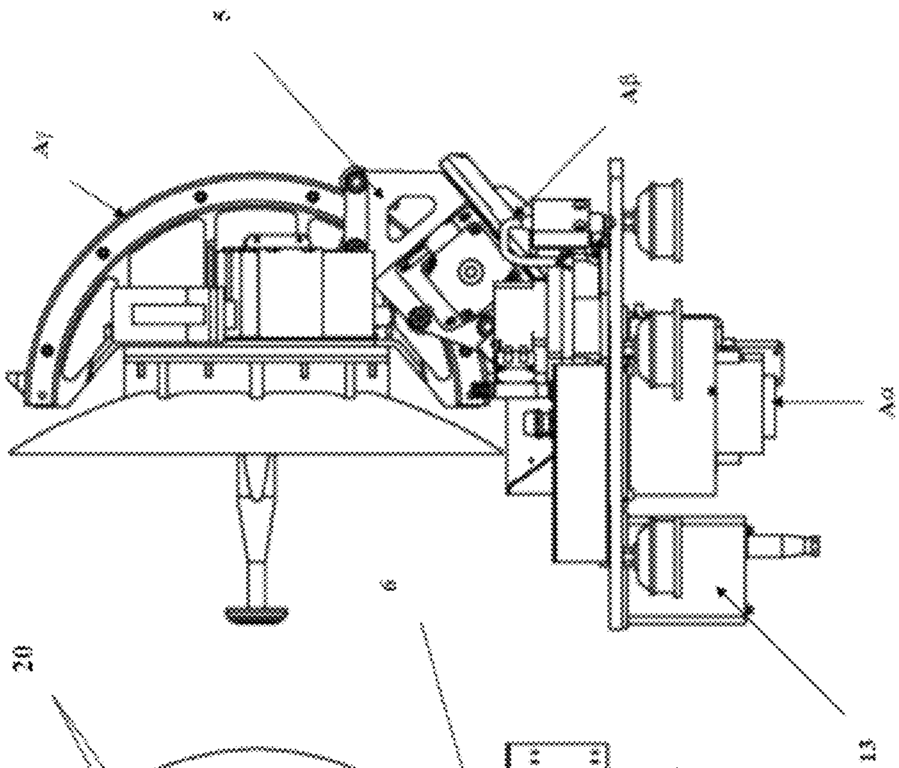
Figure 2C:
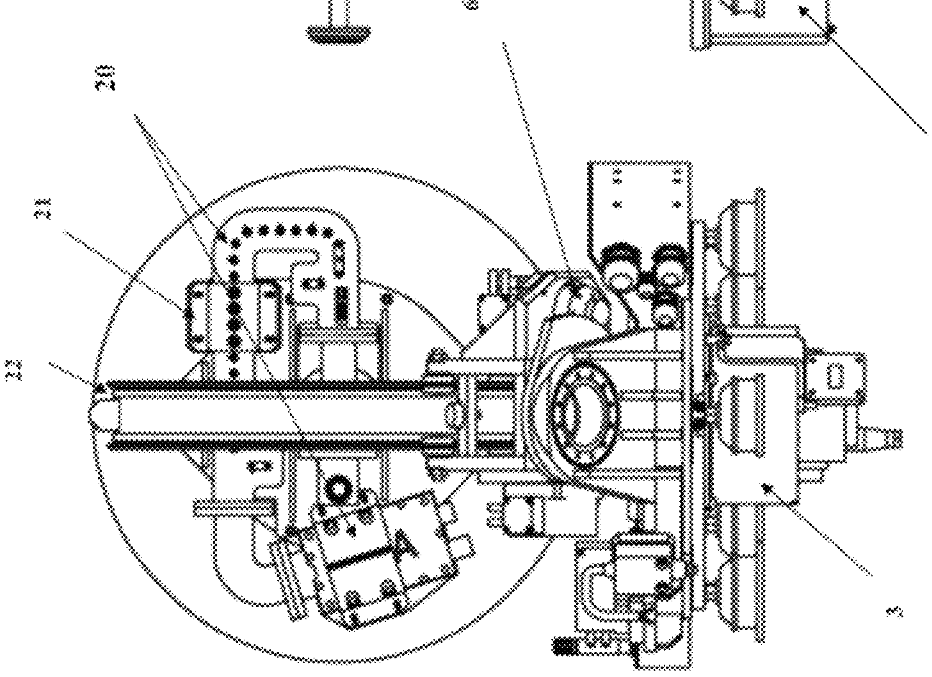

The axis Aγ consists of two parts. A fixed part located on the axis Aβ and a mobile part with a travel of −18 to +110°, FIG. 5:

the fixed part has a motor-drive 7 (FIG. 5) identical to the other axes and also a roller support stirrup 5 (FIG. 5) for the displacement of the mobile part of this axis, the mobile part consists of the cradle frame 8, FIG. 6, on which are fixed circular guidance half-rings 9A, 9B and a driving rack which is not represented, but also the interface 21 (FIG. 2C) for fixing the antenna 12 and RF elements 20; one of the half-rings 9A, for example, has a notched part which will allow for the guidance by the rack, the other half-ring being able to be smooth; the two half-rings are provided on their circumference with V-shaped rails (22, FIG. 2C). Abutments 60, only one being represented in the figure, are arranged preferably at the two ends 8A, 8B of the cradle frame 8.

Without departing from the framework of the invention, it would be possible to imagine means equivalent to the stirrup 5 and to the rollers in order to move the two half-rings.

The axis Aγ is equipped with mechanical abutments 60 which notably allow for the origin-setting produced by docking on one of the two mechanical abutments and the detection of current peaks by variable speed drives controlling the motors of the APU module 10, by techniques known to those skilled in the art. One possibility consists in detecting an over-power for establishing the zero of the axis Aγ.

The guidance of the axis Aγ is done using 8 rollers 51 made of stainless steel for example (4 fixed rollers 51 and 4 with a V-shaped eccentric 52), the rollers 51, 52 including a groove 51A, 52A allowing for the sliding of the V-shaped rails 22 of the two circular guidance half-rings 9A, 9B.

FIG. 6 represents the mounting of the cradle 8 receiving the antenna 12 and the two guidance half-rings as described previously.

The antenna positioner may also comprise:

two APU modules (power units), 10A, 10B, for a power supply function and for the variable speed drives;

an inertial unit 13;

a radiofrequency system 20 consisting, for example, of a diplexer, a low-noise amplifier and a waveguide network which is not detailed for reasons of simplicity.

For the example explained above, the operation is described below.

The motor drive of the axis Aα has to drive the movement of all the elements situated above the rolling bearing of this same axis. The cradle is oriented so as to have the maximum offset (pointing to −18° and inclination of the β axis of 30°).

The motor drive of the axis Aβ must drive the movement of all the elements situated above the rolling bearing of this same axis. The cradle is oriented so as to have the maximum offset (point to 110°).

The motor drive of the axis Aγ must drive the movement of all the elements embedded with the antenna at the level of this same axis.

The gear motors of the three axes are controlled, for example, by variable speed drives driven by serial bus known to those skilled in the art which crosses the alpha axis via the electrical collector.

The serial system bus, better known by the abbreviation CAN (Controller Area Network), not represented in the figure, enables an antenna control unit, better known by the acronym ACU, to transmit the positioning commands to the motors and to read the axis position information supplied by the coders incorporated in the gear motors.

The inertial motion unit, or IMU, embedded on the fixed frame of the positioner transmits to the ACU, via a serial interface, the attitude information of the carrier. Based on this information, the ACU creates and transmits the pointing set-points to the antenna positioner.

The invention claimed is:

1. A positioner for an antenna to be placed in a given or restricted volume, comprising:

a first axis Aαensuring the movement of the antenna in azimuth, said first axis Aαwith continuous rotation comprises a fixed frame on which is mounted a mobile frame, an electrical collector provided with a revolving seal, and an α motor-drive subassembly, a third axis Aγensuring the movement of the antenna in elevation, said third axis Aγbeing orthogonal and coplanar to the first axis Aα, said third axis Aγcomprises a cradle supporting the antenna and two half-rings for circular guidance, said half-rings being provided with V-shaped guiding rails sliding on grooves of said rollers, said third axis Aγbeing inserted into a roller support of said second axis Aβ, a second axis of rotation Aβor cross-elevation axis positioned so as to intersect said first axis Aαand said third axis Aγat one and a same virtual point O, said virtual point O of intersection of the three axes Aα, Aβ, Aγconstituting a pivot point of the movements of said antenna mounted on the positioner, said second axis Aβcomprises a support for pivoting means, a βmotor-drive subassembly, a γmotor-drive subassembly, for said rollers comprising a groove, said second axis Aβbeing inserted into an orifice O2 of the fixed frame forming an angle Ψwith the axis Aα, the angle Ψlying within the range from 20° to 70°.

2. A positioner according to claim 1, wherein said first axis Aαis adapted to define a travel of n ×360 degrees in α by virtue of said electrical collector, and said second axis Aβis chosen to define a travel of plus-or-minus 30°, and said third axis Aγa travel within the range from −18° to ×110 °.

3. A positioner according to claim 1, wherein said first axis Aαis provided with impact dampers distributed on said fixed frame.

4. A positioner according to claim 1, wherein said first axis Aαcomprises:

in a top part a rolling bearing captive between an interface plate and the fixed frame, and on a fixed outer ring of the rolling bearing, a ring gear is mounted to drive the axis Aαin rotation, and a detection cam which will make it possible to position the axis Aαat the moment when said cam passes over a position detector attached to said mobile frame.

5. A positioner according to claim 1, being made of a material resistant to corrosion.

6. A positioner according to claim 5, made of an alloy of aluminium protected by bichromated anodic oxidation.

7. A positioner according to claim 1, wherein each of said first, second and third axes comprises a toothed positioning frame associated with a gear motor with integrated coder.

8. A positioner according to claim 1, wherein the antenna is surrounded by a radome R and said positioner, antenna, and radome assembly is arranged on a mobile carrier.

9. A positioner according to claim 8, wherein the mobile carrier is a ship or a submarine.

* * * * *